Aug. 25, 1953     F. F. McCANDLESS     2,649,852
HOT DOG BARBECUE AND BUN WARMER
Original Filed June 2, 1949     2 Sheets—Sheet 1
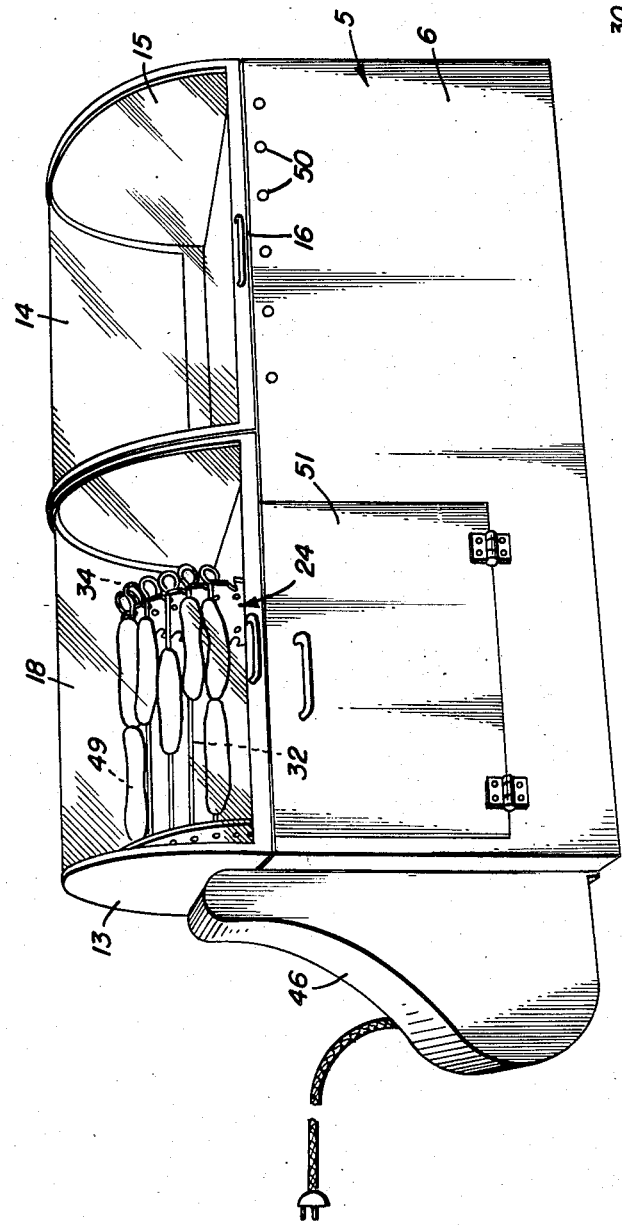
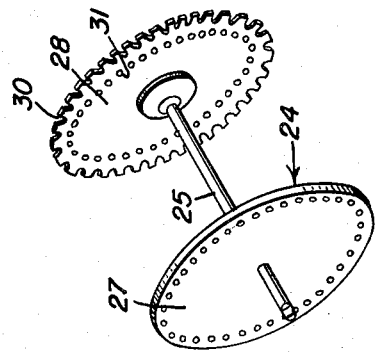
Field F. McCandless
INVENTOR.

Aug. 25, 1953　　　F. F. McCANDLESS　　　2,649,852
HOT DOG BARBECUE AND BUN WARMER
Original Filed June 2, 1949　　　　　　2 Sheets-Sheet 2
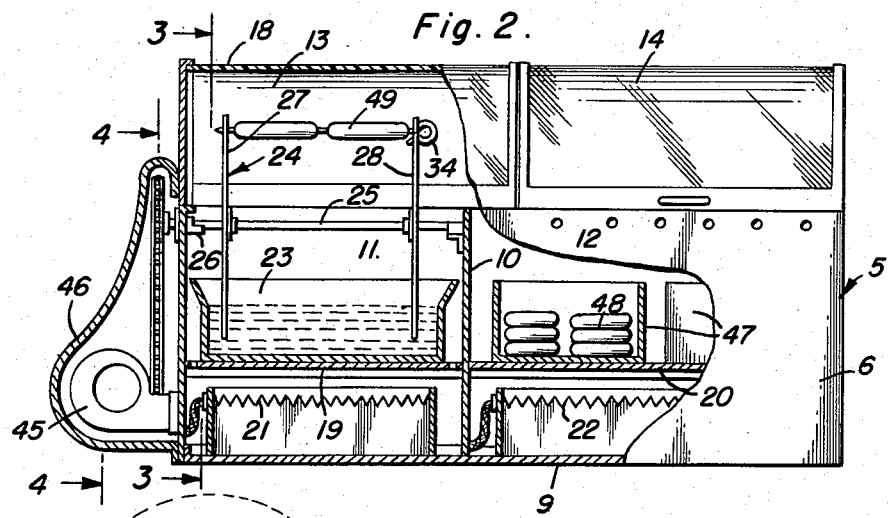
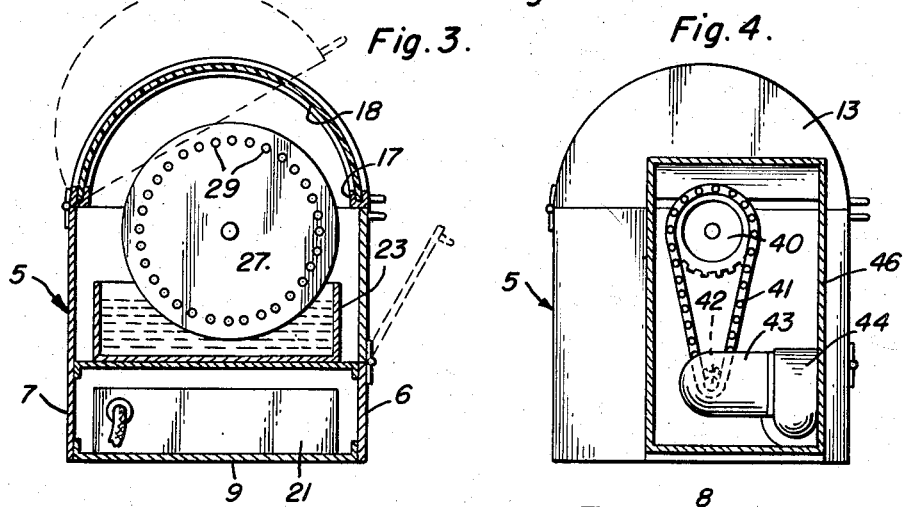
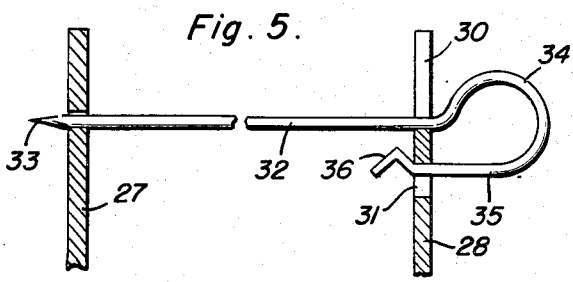
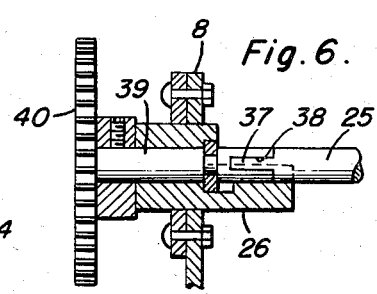
Field F. McCandless
INVENTOR.

Patented Aug. 25, 1953

2,649,852

UNITED STATES PATENT OFFICE 2,649,852

HOT DOG BARBECUE AND BUN WARMER

Field F. McCandless, Houston, Tex., assignor of thirty-three and one-third per cent to Abe Gollob and thirty-three and one-third per cent to Fermon T. Walton, both of Houston, Tex.

Original application June 2, 1949, Serial No. 96,673. Divided and this application December 9, 1949, Serial No. 132,015

1 Claim. (Cl. 126—273)

This is a divisional application of my co-pending application filed June 2, 1949, Serial No. 96,673, now abandoned.

The present invention relates to new and useful improvements in cooking apparatus, and more particularly to a portable hot dog barbecue and bun warmer.

An important object of the invention is to provide a display case formed with a pair of compartments, one compartment housing the barbecue apparatus and the other compartment suitable for containing buns or other food products, and providing a heating element in the barbecue compartment with means for circulating the heated air therefrom into the bun compartment.

A still further object is to provide an apparatus of this character of simple and practical construction, which is attractive in appearance, efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is a front elevational view with parts broken away and shown in section.

Figure 3 is a transverse sectional view taken on a line 3—3 of Figure 2.

Figure 4 is a transverse sectional view of the motor housing taken on a line 4—4 of Figure 2.

Figure 5 is an enlarged fragmentary sectional view of the reel showing one of the spits mounted thereon.

Figure 6 is an enlarged fragmentary sectional view of one of the bearings for the sectional shaft of the reel, and Figure 7 is a perspective view of the reel.

Referring now to the drawings in detail, wherein for the purpose of illustration, I have disclosed a preferred embodiment of my invention, the numeral 5 designates the barbecue case generally, which is preferably of sheet metal construction and including the front and rear walls 6 and 7, end walls 8 and a bottom 9, the bottom preferably being removably secured in the case. The case 5 is of rectangular form and provided with a transverse partition 10 separating the same into a barbecue compartment 11 and a bun warming compartment 12. The top of the case is open and provided with semi-cylindrical hinged covers 13 and 14, for the compartments 11 and 12 respectively, the cover 13 projecting beyond the partition 10, to extend partly over the compartment 12. End walls 15 close the ends of the covers and the front or free edge of the covers are provided with handles 16. Each cover comprises a frame 17 in which a semi-cylindrical glass or other transparent body 18 is secured.

Perforated shelves 19 and 20 are suitably supported in the respective compartments 11 and 12, and beneath which are positioned electric heating elements 21 and 22, the heating elements being supported on the bottom 9 for removal from the case therewith. A pan 23 is supported on shelf 19 for containing barbecue sauce or other liquids, and a reel designated generally at 24 and provided with a shaft or trunnion 25 at each end is rotatably supported in the compartment 11 by means of bearing brackets 26 suitably secured in the adjacent end wall 8 and to the partition 10, the bearing brackets being open at their upper edge for removably seating the shaft or trunnion 25 therein.

The reel 24 also includes discs or flanges 27 and 28 suitably secured in spaced relation with respect to each other on the shaft or trunnion 25, the disc 27 being formed with circumferentially arranged openings 29 adjacent its periphery, and a disc 28 being formed with notches 30 in its periphery and with an opening 31 adjacent each notch.

The reel 24 supports a plurality of spits 32 with the pointed end 33 thereof inserted in one of the openings 29 of disc 27 and the opposite end of the spit received in one of the notches 30 and projecting outwardly of disc 28 and curved to form a hand gripping loop 34 with its free end constituting a resilient catch 35 engaged in an adjacent opening 31 and formed with an offset 36 locked behind the disc 28, as shown more clearly in Figure 5 of the drawings.

One end of the shaft or trunnion 25 is formed with a locking key 37 engaged in the bifurcated end 38 of a shaft 39 journaled in bearing 26 and extending outwardly through the adjacent end wall 8 for attaching a sprocket 40 thereto. The sprocket 40 is driven by a chain 41 from a sprocket 42 connected to an electric motor 43 which also drives a blower 44 having its outlet connected to compartment 11 under shelf 19.

The sprockets 40 and 42, chain 41, motor 43 and blower 44 are enclosed in a housing 46 suitably secured to the outside of the end wall 8.

One or more trays or pans 47 are supported on shelf 20 in compartment 12 for holding buns or other food products 48 and one or more wieners or hot dogs 49 are impaled on the spits 32.

In the operation of the device, the spits 32 holding the wieners 49 are secured to the discs 27 and 28 of reel 24, and the motor 43 is operated in the usual manner to drive chain 41 and sprockets 40 and 42 to rotate the reel for immersing the hot dogs 49 in a barbecue sauce or other liquid contained in pan 23.

The heating elements 21 and 22 are energized in a suitable manner to heat the contents of pan 23, the heat passing upwardly through shelves 19 and 20 to thus heat the upper portion of compartments 11 and 12 wherein the hot dogs and buns are contained.

The overlapping of cover 13 over compartment 12 enables blower 44 to circulate air through compartment 11 and cover 13 into compartment 12 where it escapes through vent openings 50 to prevent fogging of the glass 18.

The front wall 6 is also provided with a hinged door 51 providing access to compartment 11.

Having described the invention, what is claimed as new is:

A barbecue apparatus comprising a rectangular case having side and end walls, and a closed bottom and open top, a vertical central partition in said case extending from top to bottom thereof and dividing the same transversely into a pair of side by side food cooking and warming compartments, respectively, a horizontal perforated shelf in the bottom of said cooking compartment dividing the same horizontally and spaced from said bottom of the case for supporting a cooking utensil elevated above the bottom of the case, a heating element in the space between the horizontal shelf and the bottom of the case, a blower on the outside of the case discharging into said space to force air heated in said space by said element upwardly through said partition and out of the top of the cooking compartment, an arcuate cover for the top of the cooking compartment and a portion of the top of the warming compartment, said cover being solid and extending beyond said partition and opening downwardly to form an arched flue passing heated air forced upwardly out of said cooking compartment into the top of said warming compartment, and a cover for the remainder of the top of said warming compartment.

FIELD F. McCANDLESS.

References Cited in the file of this patent

UNITED STATES PATENTS

| Number | Name | Date |
|---|---|---|
| 1,312,833 | Colias | Aug. 12, 1919 |
| 1,476,215 | Pace | Dec. 4, 1923 |
| 1,509,752 | Hassler et al. | Sept. 23, 1924 |
| 1,786,300 | Harrison | Dec. 23, 1930 |
| 1,876,614 | Claus | Sept. 13, 1932 |
| 1,988,238 | Coplen | Jan. 15, 1935 |
| 2,005,501 | Kelly | June 18, 1935 |
| 2,211,024 | Nardin | Aug. 13, 1940 |
| 2,367,007 | Cossin | Jan. 9, 1945 |
| 2,422,450 | Van Daam | June 17, 1947 |
| 2,454,370 | Beaubien | Nov. 23, 1948 |
| 2,469,778 | Morici | May 10, 1949 |
| 2,561,517 | Ladge | July 24, 1951 |
| 2,562,723 | Keller | July 31, 1951 |
| 2,566,553 | Cline | Sept. 4, 1951 |